(12) United States Patent
Gao et al.

(10) Patent No.: US 8,787,294 B2
(45) Date of Patent: Jul. 22, 2014

(54) RESPONSE MESSAGE TRANSMISSION METHOD, BASE STATION, AND USER EQUIPMENT

(75) Inventors: Xuejuan Gao, Beijing (CN); Zukana Shen, Beijing (CN); Yanan Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/701,497

(22) PCT Filed: Sep. 16, 2011

(86) PCT No.: PCT/CN2011/079745
§ 371 (c)(1),
(2), (4) Date: Mar. 21, 2013

(87) PCT Pub. No.: WO2012/034536
PCT Pub. Date: Mar. 22, 2012

(65) Prior Publication Data
US 2013/0265946 A1    Oct. 10, 2013

(30) Foreign Application Priority Data
Sep. 16, 2010   (CN) .......................... 2010 1 0285409

(51) Int. Cl.
*H04W 4/00*      (2009.01)
(52) U.S. Cl.
USPC ........................................................ 370/329
(58) Field of Classification Search
None
See application file for complete search history.

(56) References Cited

U.S. PATENT DOCUMENTS

| 8,165,586 B2* | 4/2012 | Krishnamurthy et al. ..... 455/436 |
| 8,406,171 B2* | 3/2013 | Onggosanusi et al. ........ 370/328 |
| 8,503,338 B2* | 8/2013 | Jongren et al. ................ 370/280 |
| 2013/0163406 A1 | 6/2013 | Oizumi et al. |

FOREIGN PATENT DOCUMENTS

| CN | 101080046 A | 11/2007 |
| CN | 101197611 A | 6/2008 |
| CN | 101499882 A | 8/2009 |

OTHER PUBLICATIONS

PCT International Search Report for PCT Counterpart Application No. PCT/CN2011/079745, 5 pages, (Dec. 29, 2011).

(Continued)

*Primary Examiner* — Clemence Han
(74) *Attorney, Agent, or Firm* — Blakely, Sokoloff, Taylor & Zafman LLP

(57) ABSTRACT

Disclosed are a response message transmission method, a base station, and a user equipment (UE), to achieve an improved system performance while taking into account the system resource overhead. The method comprises: the UE confirming K bit of response message awaiting feedback; the UE confirming M number of channel resources awaiting selection, the M number of channel resources awaiting selection comprising J number of dynamic channel resources and N number of semi-static channel resources, wherein M=(J+N), 0=N=M, (M−N)=L=M, and M, L, and N are integers; the UE selecting at least one channel resource from the M number of channel resources, and selecting a piece of identification information for use in characterizing the response message awaiting feedback; on each of the selected channel resources, the UE transmitting the selected identification information for use in characterizing the response message awaiting feedback. Employment of the technical solution of the present invention allows to a certain degree an improved system performance and system throughput, while at the same time taking into account the system resource overhead.

20 Claims, 6 Drawing Sheets

(56) References Cited

OTHER PUBLICATIONS

European Patent Office Communication enclosing Extended European Search Report for corresponding European Patent Application No. 11824606.5, 7 pgs., (Jul. 24, 2013).
Catt, "UL ACK/NACK Transmission Design in FDD with CA", 3GPP TSG RAN WG1 Meeting #60, R1-100876, San Francisco, CA, USA, XP050418480, 5 pgs., (Feb. 22-26, 2010).

"3GPP TS 36.213 V8.7.0", 3rd Generation Partnership Project, Technical Specification Group Radio Access Network; Evolved Universal Terrestrial Radio Access (E-UTRA); Physical Layer Procedures; (Release 8); XP050338736, 81 pgs., (May 2009).
Written Opinion of the International Search Authority for PCT/CN2011/079745 with full English translation, 10 pgs. (Dec. 29, 2011).
PCT international Preliminary Report on Patentability for PCT Application No. PCT/CN2007/002386 with full English translation, 12 pgs. (Mar. 19, 2013).

* cited by examiner

RESPONSE MESSAGE TRANSMISSION METHOD, BASE STATION, AND USER EQUIPMENT

CROSS-REFERENCE TO RELATED APPLICATIONS

This application is a U.S. National Stage of International Application No. PCT/CN2011/079745, filed Sep. 16, 2011, designating the United States, and claiming the benefit of Chinese Patent Application No. 201010285409.4, filed with the Chinese Patent Office on Sep. 16, 2010 and entitled "Method for transmitting response information, base station and user equipment", both of which are hereby incorporated by reference in their entireties.

FIELD

The present invention relates to the field of communications and particularly to a method for transmitting response information, a base station and a user equipment.

BACKGROUND

At present the Physical Uplink Control Channel (PUCCH) Format 1b with channel selection can be adopted in a Long Term Evolution Advanced (LTE-A) system with Carrier Aggregation (CA) as a multiplexing transmission scheme of an Acknowledge (ACK) character or a Negative Acknowledge (NACK) character. A dynamic channel resource reserved on an uplink primary component carrier shall be made best use possible of in order to reduce the overhead of uplink control channel resources; the state of multiple-to-one ambiguity in an ACK/NACK mapping table shall be avoided in order to avoid unnecessary retransmission in the system and to improve the throughput performance of the system; and the ACK/NACK mapping table may be applied to both an across-carrier scheduling scenario and a non-across-carrier scheduling scenario in order to reduce the complexity of a standard when an across-carrier scheduling is supported by the LTE-A system, and different channel resources may be required when a User Equipment (UE) transmits ACK/NACK using the PUCCH Format 1b with channel selection in the across-carrier scheduling scenario and the non-across-carrier scheduling scenario.

For a long term evolution multi-carrier system, a higher system bandwidth, for example, a 100 MHz system bandwidth, than a bandwidth of an LTE system can be allocated directly for the system in order to support the 100 MHz system bandwidth as illustrated in FIG. 1; alternatively, all or a part of a spectrum allocated can be aggregated, i.e., carriers can be aggregated, into the 100 MHz system bandwidth for provision to the long term evolution multi-carriers/system as in FIG. 2, in which case uplink and downlink carriers may be configured asymmetrically in the system, for example, a user equipment can occupy N (N≥1) carriers for downlink transmission and M (M≥1) carriers for uplink transmission.

At present aggregation of at most 5 carriers can be supported in the LTE-A system, and a UE in the LTE-A system has to feed back ACK/NACK feedback information corresponding to a plurality of downlink carriers and downlink sub-frames in the same uplink sub-frame. In the LTE-A system, ACK/NACK information of no more than 4 bits can be transmitted using the PUCCH Format 1b with channel selection. With the PUCCH Format 1b with channel selection, the UE selects one channel resource among a plurality of channel resources (i.e., candidate channel resources as required) for transmission to distinguish different ACK/NACK feedback information states, where an ACK/NACK mapping table is used for a mapping relationship between ACK/NACK feedback information, real channel transmission information (that is, 4 constellation points with QPSK modulation in the PUCCH format 1b, i.e., QPSK modulation symbols) and a selected channel used to transmit the real channel transmission information. For example, 2, 3 and 4 uplink control channel resources are required for the transmission of 2-bit, 3-bit and 4-bit ACK/NACK feedback information respectively.

At present, all of channel resources used for the transmission of ACK/NACK feedback information using the PUCCH Format 1b with channel selection are dynamic channel resources in the Long Term Evolution (LTE) system, where a dynamic channel resource refers to an uplink control channel resource, reserved on an uplink carrier, for each Control Channel Element (CCE) in a control information region of a corresponding downlink carrier in pair with the uplink carrier. The UE calculates and obtains one available uplink control channel resource from the lowest CCE index of each Physical Downlink Control Channel (PDCCH) transmitted on the downlink carrier, that is, each PDCCH corresponds to one available uplink control channel resource of the PUCCH formats 1/1a/1b, and such a resource is referred to a "dynamic channel resource" or an "implicit channel resource".

In the LTE-A system, the dynamic channel resources reserved on each Up Link Component Carrier (UL CC) are only for the PDCCH on a DL CC paired with the UL CC, and a PUCCH can only be transmitted on an Up Link Primary Component Carrier (UL PCC), so a dynamic channel resource is only present on an UL PCC from the perspective of the UE, and since the UL PCC reserves a dynamic channel resource only for a Down Link Primary Component Carrier (DL PCC) corresponding to the UL PCC, that is, a dynamic channel resource is only present for a PDCCH transmitted on the DL PCC, not all the channel resources required for the transmission of ACK/NACK using the PUCCH Format 1b with channel selection may necessarily be obtained from dynamic channel resources. As illustrated in FIG. 3 where 2-bit ACK/NACK feedback information is transmitted using the PUCCH Format 1b with channel selection, and when no across-carrier scheduling is supported in the LTE-A system, the UE can only obtain one dynamic channel resource from the UL PCC (i.e., the UL CC1), and since the DL CC2 is not a PCC, a dynamic channel resource on the UL PCC cannot be obtained from a PDCCH transmitted on the DL CC2 and thus a higher-layer semi-statically configured channel resource is required. Further as illustrated in FIG. 4, 4-bit ACK/NACK feedback information is transmitted using the PUCCH Format 1b with channel selection, and even if across-carrier scheduling is supported in the LTE-A system, the UE can only obtain one dynamic channel resource respectively from an UL CC1 and an UL CC2, so 2 additional semi-static channel resources are required for the UE to transmit the 4-bit ACK/NACK feedback information using the PUCCH format 1b with channel selection.

The method for obtaining the channel resource and the type of required channel resources may be different respectively in different scheduling scenarios when the UE transmits ACK/NACK feedback information using the PUCCH Format 1b with channel selection. Thus an ACK/NACK mapping table shall be designed based on the type of the channel resource. For a downlink carrier using a dynamic channel resource, the UE can not obtain a corresponding dynamic channel resource when a PDCCH scheduling the carrier is lost, and this state is represented as Discontinuous Transmission (DTX), and thus, feedback information states of the UE for the downlink carrier include ACK (to characterize correct reception of a data packet), NACK (to characterize wrong reception of a data packet) and DTX (to characterize a data packet being lost or not scheduled), which means that an ACK/NACK mapping table shall satisfy the followings: when the feedback state for the downlink carrier is DTX, an ACK/NACK/DTX combination state to be fed back from the UE can not be transmitted on a channel resource corresponding to the carrier. For a downlink carrier using a higher-layer semi-statically configured channel resource, there is always an available channel resource present regardless of whether a PDCCH scheduling the downlink carrier is lost or not, and at this time, an ACK/NACK/DTX combination state to be fed back can be transmitted on a channel resource corresponding to the downlink carrier regardless of whether the feedback state of the downlink carrier is DTX or not.

In summary an ACK/NACK mapping table shall be designed by taking into account the type of the channel resource in use, and there are a large number of ACK/NACK/DTX combination states in an ACK/NACK mapping table with all the channel resources being dynamic channel resources. Taking 4-bit ACK/NACK feedback information in the LTE system as an example, there are 19 ACK/NACK/DTX combination states, but at most 16 states can be distinguished by 4 channel resources and 4 constellation points with QPSK modulation, so there may be an overlapping mapping between different ACK/NACK/DTX combination states, and in this mapping scheme, a base station can not determine the actual state of ACK/NACK fed back from the UE, thus resulting in an increased number of retransmissions in and a lowered throughput of the system.

The use of a dynamic channel resource may also result in an increased number of ACK/NACK/DTX combination states despite an increased utilization ratio of an uplink channel resource of the UE, thus complicating the ACK/NACK mapping table and possibly degrading the performance of the system due to a shorten distance or an overlapping state between codewords corresponding to different ACK/NACK/DTX combination states; and the use of a higher-layer semi-statically configured channel resource may result in an increased overhead of uplink control channel resources although the number of ACK/NACK/DTX combination states can be reduced to some extent to thereby increase the distance between codewords and avoid an overlapping state between codewords and thus improve the performance of the system.

Thus a current interesting technical problem is how to allocate an uplink channel resource for transmission of ACK/NACK feedback information to thereby improve the performance of the system while taking a resource overhead of the system into account.

SUMMARY

The invention provides a method for transmitting response information, a base station and a user equipment to improve the performance of a system and to lower a resource overhead of the system.

A method for transmitting response information includes:
a User Equipment, UE, determining K-bit response information to be fed back;
the UE determining M candidate channel resources including L dynamic channel resources and N semi-static channel resources, where $M=(L+N)$, $0 \leq N \leq M$, $(M-N) \leq L \leq M$, and M, L and N are integers;

the UE selecting at least one of the M candidate channel resources and selecting identification information to characterize the response information to be fed back; and
the UE transmitting the selected identification information to characterize the response information to be fed back on each selected channel resource.

A method for transmitting response information includes:
a base station determining the number of bits of response information to be fed back from a UE as K;
the base station determining as M the number of channel resources to be detected including L dynamic channel resources and N semi-static channel resources, where $M=(L+N)$, $0 \leq N \leq M$, $(M-N) \leq L \leq M$, and M, L and N are integers; and
the base station detecting the M channel resources to be detected, obtaining identification information to characterize the response information and obtaining the response information.

A user equipment includes:
a response information determining unit configured to determine K-bit response information to be fed back;
a channel resource determining unit configured to determine M candidate channel resources including L dynamic channel resources and N semi-static channel resources, where $M=(L+N)$, $0 \leq N \leq M$, $(M-N) \leq L \leq M$, and M, L and N are integers;
a transmission resource and information determining unit, connected with the channel resource determining unit, configured to select at least one of the M candidate channel resources, determined by the channel resource determining unit, and to select identification information to characterize the response information to be fed back; and
a transmitting unit, connected with the transmission resource and information determining unit, configured to transmit the identification information to characterize the response information to be fed back on the channel resource selected by the transmission resource and information determining unit.

A base station includes:
a response information determining unit configured to determine the number of bits of response information to be fed back from a UE as K;
a channel resource determining unit configured to determine M channel resources to be detected including L dynamic channel resources and N semi-static channel resources, where $M=(L+N)$, $0 \leq N \leq M$, $(M-N) \leq L \leq M$, and M, L and N are integers; and
a receiving unit configured to obtain identification information to characterize the response information on the channel resources to be detected and to obtain the response information transmitted from the UE.

In the embodiments of the invention, a UE determines M candidate channel resources according to the number of bits of response information to be fed back, and the M candidate channel resources include L dynamic channel resources and N semi-static channel resources, where $M=(L+N)$, $0 \leq N \leq m$, $(M-N) \leq L \leq M$, and M, L and N are integers; the UE selects at least one of the M candidate channel resources and selects identification information to characterize the response information to be fed back; and the UE transmits the selected identification information to characterize the response information to be fed back on each selected channel resource. With the technical solution of the invention, the user equipment transmits the response information to be fed back on both a dynamic channel resource and a semi-static channel resource to thereby improve the performance of a system and a throughput of the system to some extent while taking a resource overhead of the system into account.

DETAILED DESCRIPTION OF THE EMBODIMENTS

In order to improve the performance of a system and a throughput of the system while lowering a resource overhead of the system, an embodiment of the invention provides a method for transmitting response information, and the method includes the followings: a UE determines K-bit response information to be fed back and determines M candidate channel resources including L dynamic channel resources and N semi-static channel resources, where M=(L+N), $0 \leq N \leq M$, $(M-N) \leq L \leq M$, and M, L and N are integers; the UE selects at least one of the M candidate channel resources and selects identification information to characterize the response information to be fed back; and the UE transmits the selected identification information to characterize the response information to be fed back on each selected channel resource. Correspondingly a base station detects the M candidate channel resources, receives the identification information, to characterize the response information to be fed back, transmitted from the UE on at least one of the channel resources and obtains the response information. With the technical solution of the invention, the user equipment transmits the response information to be fed back on both a dynamic channel resource and a semi-static channel resource to thereby improve the performance of the system and a throughput of the system to some extent while taking a resource overhead of the system into account, thus overcoming the problem of a degraded performance of the system and a lowered throughput of the system due to the use of only a dynamic channel resource and the problem of an excessive resource overhead of the system due to the use of only a semi-static channel resource for transmission of the response information to be fed back in the prior art.

The technical solution of the invention will be described below in details with reference to the drawings of the invention.

Figure 1:
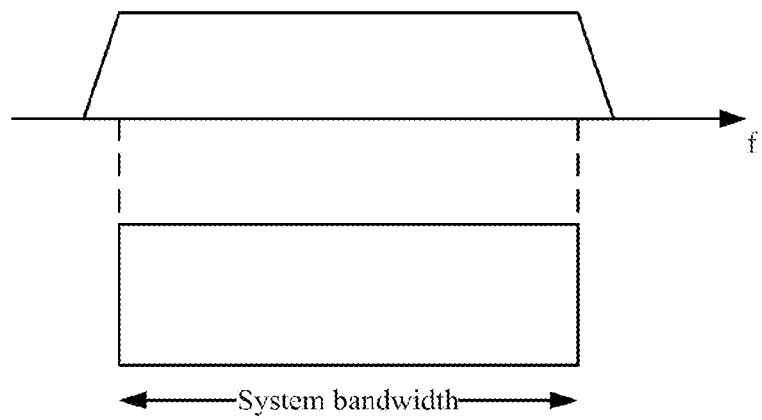
FIG. 1 is a schematic diagram of a system bandwidth of a single-spectrum system in the prior art.
Figure 2:
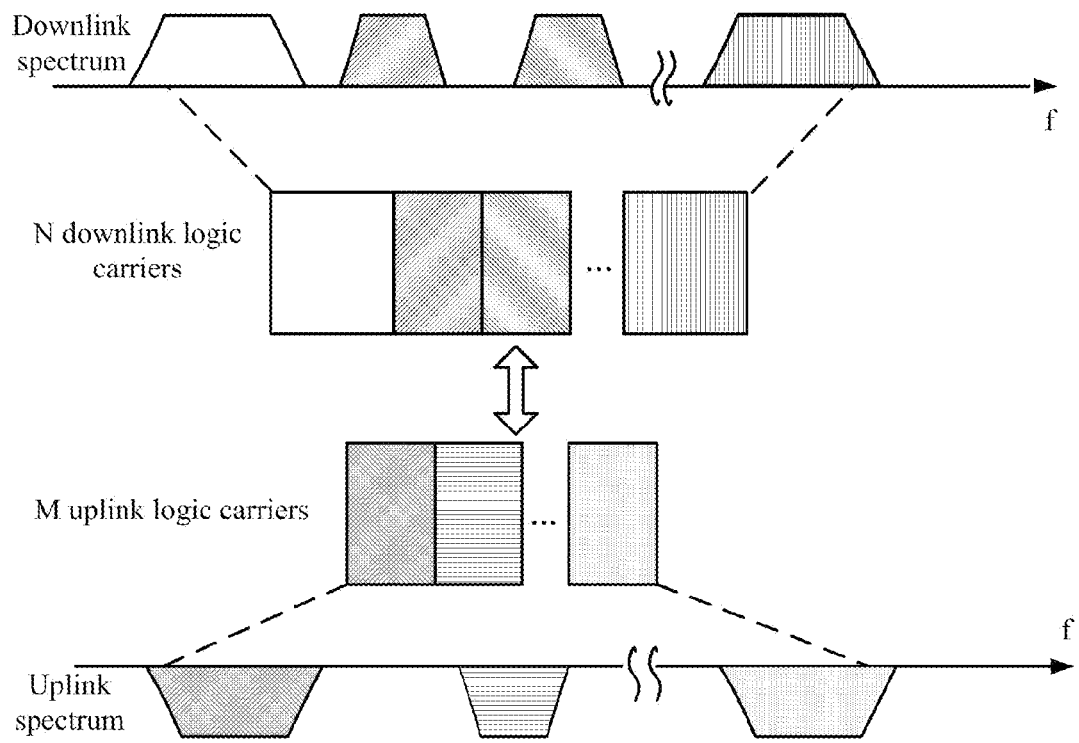
FIG. 2 is a schematic diagram of uplink and downlink transmission in a system with carrier aggregation in the prior art.
Figure 3:
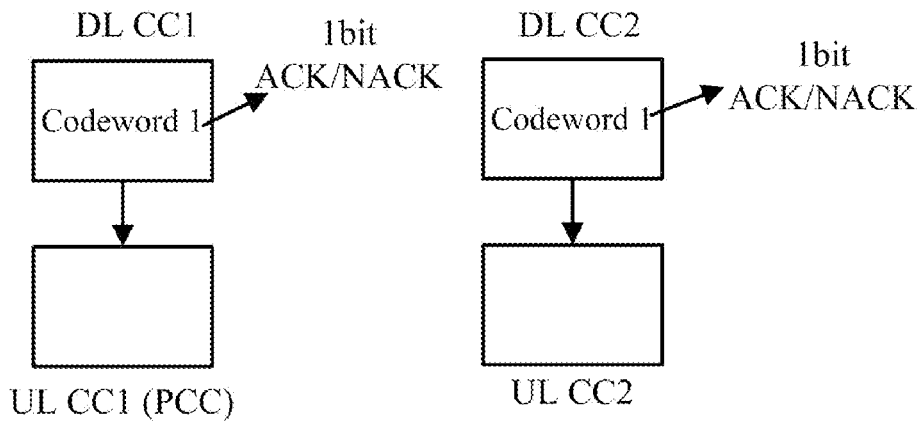
FIG. 3 is a schematic diagram of transmission of 2-bit ACK/NACK feedback information in the prior art.
Figure 4:
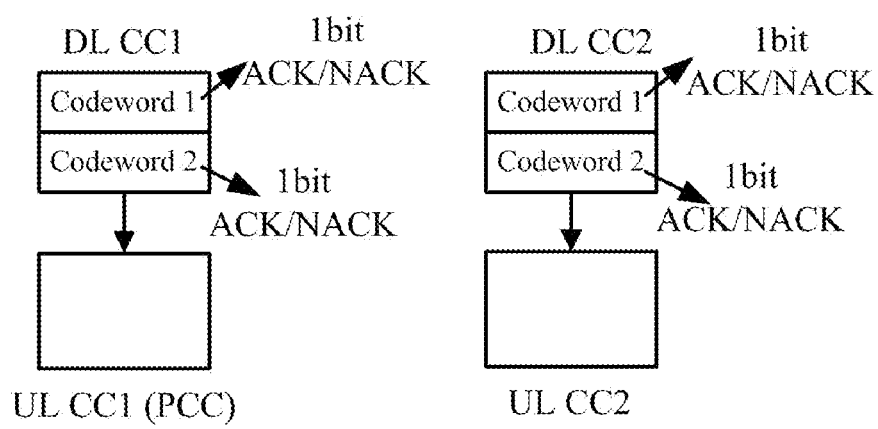
FIG. 4 is a schematic diagram of transmission of 4-bit ACK/NACK feedback information in the prior art.
Figure 5A:
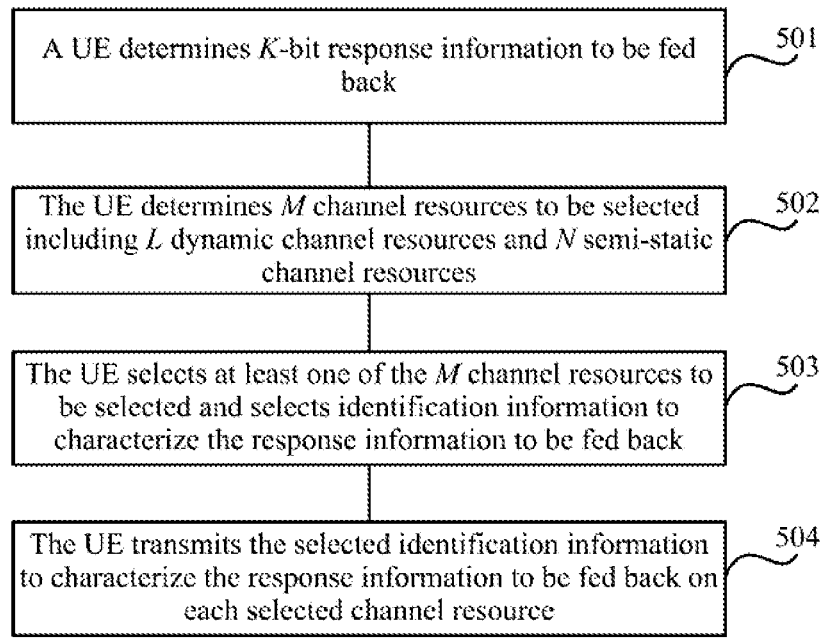
FIG. 5A and FIG. 5B are flow charts of a method for allocating a control channel resource in embodiments of the invention.

Referring to FIG. 5A which is a flow chart of a method for transmitting response information at the side of a user equipment in an embodiment of the invention, and this method includes:

Operation 501. A UE determines K-bit response information to be fed back.

Operation 502. The UE determines M candidate channel resources including L dynamic channel resources and N semi-static channel resources, where M=(L+N), $0 \leq N \leq M$, $(M-N) \leq L \leq M$, and M, L and N are integers.

Operation 503. The UE selects at least one of the M candidate channel resources and selects identification information to characterize the response information to be fed back.

Operation 504. The UE transmits the selected identification information to characterize the response information to be fed back on each selected channel resource.

In an embodiment of the invention, the N semi-static channel resources are N channel resources configured by higher-layer signaling; or the N semi-static channel resources are N channel resources selected among T channel resources configured by higher-layer signaling, and these N semi-static channel resources are indicated by a Physical Downlink Control Channel (PDCCH), where $T \geq N$.

Preferably the PDCCH is transmitted on a Down Link Secondary Component Carrier (DL SCC) of the UE to schedule a Physical Downlink Shared Channel (PDSCH) on the DL SCC.

Preferably in the operation 502, the L dynamic channel resources are particularly determined by the UE from the indexes of Control Channel Elements (CCEs) of PDCCHs transmitted on a Down Link Primary Component Carrier (DL PCC) of the UE. Preferably the PDCCHs include a PDCCH for scheduling a PDSCH transmitted on the DL PCC of the UE, a PDCCH for scheduling a PDSCH transmitted on the DL SSC of the UE and a PDCCH transmitted on the DL PCC of the UE to instruct a downlink Semi-Persistently Scheduled (SPS) resource to be released.

Preferably the operation 502 further includes: the UE determines S dynamic channel resources according to the PDCCHs and selects the L dynamic channel resources from the S dynamic channel resources as the candidate channel resources particularly as follows:

With $S > (M-N_0)$, $L = (M-N_0)$ and $N = N_0$ are determined, and the UE selects $(M-N_0)$ dynamic channel resources from the S dynamic channel resources, where $N_0$ is the smallest number of semi-static channel resources, configured by higher-layer signaling or predefined between a base station and the UE, for transmission of the K-bit response information to be fed back, and $0 \leq N_0 \leq M$; and With $S \leq (M-N_0)$, $L=S$ and $N=(M-S)$ are determined, where S is a nonnegative integer.

Preferably in the operation 504, the UE transmits the identification information to characterize the response information to be fed back using the Physical Uplink Control Channel (PUCCH) format 1b on the selected channel resource.

Preferably in an embodiment of the invention, the identification information to characterize the response information to be fed back is a Quadrature Phase Shift Keying (QPSK) modulation symbol, particularly four possible modulation symbols +1, −1, +j and −j, which can be represented as four states of a 2-bit binary number "00", "11", "10" and "01".

The response information in an embodiment of the invention includes any one or combination of:

ACK to characterize correct reception of a data packet;

NACK to characterize incorrect reception of a data packet; and

DTX to characterize a data packet being lost or not scheduled.

Figure 5B:
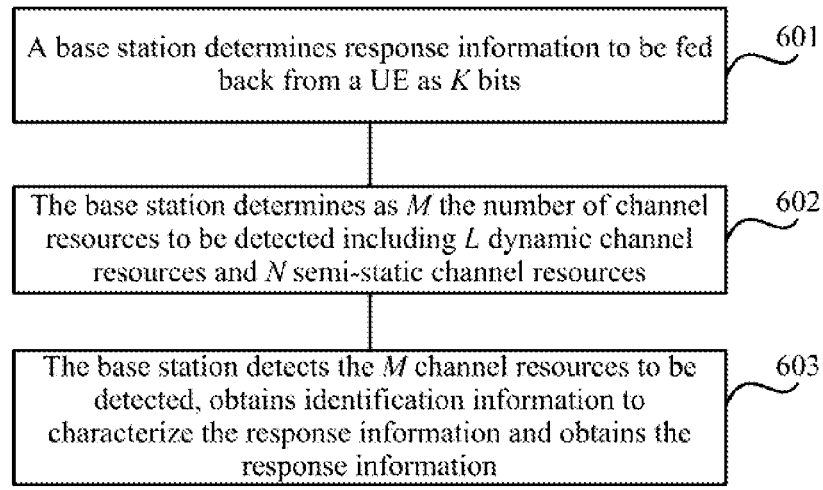

Referring to FIG. 5B which is a flow chart of a method for transmitting response information at the side of a base station in an embodiment of the invention, the method includes:

Operation 601. A base station determines response information to be fed back from a UE as K bits.

Operation 602. The base station determines as M the number of channel resources to be detected including L dynamic channel resources and N semi-static channel resources, where M=(L+N), 0≤N≤M, (M−N)≤L≤M, and M, L and N are integers.

Operation 603. The base station detects the M channel resources to be detected, obtains identification information to characterize the response information and obtains the response information.

In the operation 602, the N semi-static channel resources are N channel resources configured by higher-layer signaling; or the N semi-static channel resources are N channel resources selected among T channel resources configured by higher-layer signaling, and these N semi-static channel resources are indicated by a Physical Downlink Control Channel (PDCCH), where T≥N.

Preferably the PDCCH is transmitted on a Down Link Secondary Component Carrier (DL SCC) of the UE to schedule a Physical Downlink Shared Channel (PDSCH) on the DL SCC.

Preferably in the operation 602, the L dynamic channel resources are particularly determined by the base station from the indexes of Control Channel Elements (CCEs) of PDCCHs transmitted on a Down Link Primary Component Carrier (DL PCC) of the UE. Preferably the PDCCHs include a PDCCH for scheduling a PDSCH transmitted on the DL PCC of the UE, a PDCCH for scheduling a PDSCH transmitted on the DL SCC of the UE and a PDCCH transmitted on the DL PCC of the UE to instruct a downlink Semi-Persistently Scheduled (SPS) resource to be released.

Preferably the operation 602 further includes: the base station determines S dynamic channel resources according to the PDCCHs and selects the L dynamic channel resources from the S dynamic channel resources as channel resources to be detected particularly as follows:

With S>(M−$N_0$), L=(M−$N_0$) and N=$N_0$ are determined, and the base station selects (M−$N_0$) dynamic channel resources from the S dynamic channel resources, where $N_0$ is the smallest number of semi-static channel resources, configured by higher-layer signaling or predefined between the base station and the UE, for transmission of the K-bit response information, and 0≤$N_0$≤M; and With S≤(M−$N_0$), L=S and N=(M−S) are determined, where S is a nonnegative integer.

Preferably in the operation 603, the base station receives the identification information to characterize the response information using the Physical Uplink Control Channel (PUCCH) format 1b on the channel resources to be detected.

Preferably in an embodiment of the invention, the identification information to characterize the response information is a Quadrature Phase Shift Keying (QPSK) modulation symbol, particularly four possible modulation symbols +1, −1, +j and −j, which can be represented as four states of a 2-bit binary number "00", "11", "10" and "01".

The response information in an embodiment of the invention includes any one or combination of:

ACK to characterize correct reception of a data packet;
NACK to characterize incorrect reception of a data packet; and
DTX to characterize a data packet being lost or not scheduled.

Preferably the operation 601 to the operation 603 as illustrated in FIG. 5B can be further added after the operation 504 of the flow illustrated in FIG. 5A for more intuitive knowledge of an interaction process between the UE and the base station.

The technical solution of the invention will be clearly described below in details in connection with practical application scenarios.

In an LTE-A system, when a UE transmits M (typically 1≤M≤4) bits of response information to be fed back using the PUCCH Format 1b with channel selection, M channel resources are required for transmission of the M-bit response information to be fed back, and the sequence numbers of these M channel resources can be represented as $n_{PUCCH,0}^{(1)}, \ldots, n_{PUCCH,i}^{(1)}, \ldots, n_{PUCCH,M-1}^{(1)}$ and high-layer signaling configures or a base station and the UE predefine the smallest number $N_0$ of semi-static channel resources for feeding back the M-bit response information. No high-layer signaling will be required for a notification with $N_0$=0. The UE transmits the response information in the following process:

Operation 1. The UE obtains response information of each data packet according to a carrier scheduling pattern; and the response information can be response information corresponding to a plurality of codewords of different downlink carriers and/or different downlink sub-frames (that is, a codeword corresponds to one piece of response information), or the response information can be response information obtained by spatially bundling response information corresponding to a plurality of codewords of different downlink carriers and/or different downlink sub-frames (that is, a plurality of codewords on the same downlink carrier and/or downlink sub-frame location correspond to one piece of bundled response information).

Operation 2. The UE obtains K (K is a natural number above or equal to 1) dynamic channel resources from the lowest CCE index of PDCCHs transmitted on an UL PCC, where the PDCCHs can include a PDCCH for scheduling a PDSCH on a DL PCC, a PDCCH for scheduling a PDSCH on another DL SCC through an across-carrier operation and a PDCCH transmitted on a DL PCC to instruct downlink Semi-Persistently Scheduled (SPS) resource to be released, and the UE selects S (S≤K) dynamic channel resources from the K dynamic channel resources, where the sequence numbers of these S dynamic channel resources can be represented as $n_1^{(1)}, \ldots, n_i^{(1)}, \ldots, n_S^{(1)}$, and determines the number N of semi-static channel resources required for use by the UE.

In this operation, the UE selects S dynamic channel resources from the K dynamic channel resources, where S is a nonnegative integer, particularly as follows:

With K>(M−$N_0$), that is, where the number of dynamic channel resources obtained by the UE is above the number of dynamic channel resources required for the UE to feed back the M-bit response information using the PUCCH Format 1b with channel selection, then the UE requires N=$N_0$ semi-static channel resources and S=M−$N_0$ dynamic channel resources to be used as candidate channel resources for transmission of the M-bit response information, where S is a nonnegative integer; and the (M−$N_0$) dynamic channel resources are selected among the K obtained dynamic channel resources, and the base station and the UE can preset a selection scheme, for example, select the first (M−$N_0$) dynamic channel resources directly among the K dynamic channel resources, or select the last (M−$N_0$) dynamic channel resources directly among the K dynamic channel resources or specify (M−N₀) dynamic channel resources among the K dynamic channel resources.

With K≤(M−N₀), that is, where the number of dynamic channel resources obtained by the UE is below or equal to the number of dynamic channel resources required for the UE to feed back the M-bit response information using the PUCCH Format 1b with channel selection, then the UE requires N=(M−S) semi-static channel resources and S=K dynamic channel resources to be used as candidate channel resources for transmission of the M-bit response information.

In an embodiment of the invention, the N semi-static channel resources required for use by the UE can be configured directly in high-layer signaling or a subset of T semi-static channel resources configured in high-layer signaling and indicated dynamically from the base station to the UE in a resource indicator field on PDCCHs, and the resource indicator field is a padding bit, an additional bit or a reused existing bit (e.g., a reused indicator bit of the Transmission Control Protocol (TCP)) in a DCI format.

Operation 3. The UE selects for the M-bit response information to be fed back a channel resource(s) and QPSK modulation symbols to characterize the response information from a corresponding mapping table according to the determined S dynamic channel resources and N semi-static channel resources and transmits the selected QPSK modulation symbols on the channel resource(s).

In an embodiment of the invention, the UE and the base station predefine a correspondence relationship between the S dynamic channel resources and N semi-static channel resources determined by the UE and the M channel resources numbered $n_{PUCCH,0}^{(1)}, \ldots, n_{PUCCH,i}^{(1)}, \ldots, n_{PUCCH,M-1}^{(1)}$ used for transmission of the M-bit response information using the PUCCH Format 1b with channel selection, for example, the sequence numbers of the S dynamic channel resources are set to $n_{PUCCH,0}^{(1)}, \ldots, n_{PUCCH,(S-1)}^{(1)}$, and the sequence numbers of the N semi-static channel resources are set to $n_{PUCCH,S}^{(1)}, \ldots, n_{PUCCH,(M-1)}^{(1)}$.

In an embodiment of the invention, the mapping table is set according to $N_0$. The response information includes: positive Acknowledge (ACK) to characterize correct reception of a data packet, Negative Acknowledge (NACK) to characterize incorrect reception of a data packet and Discontinuous Transmission (DTX) to characterize a data packet being lost or not scheduled.

The base station presets and agrees with the UE, for the number of bits of the response information, the number $N_0$ of semi-static channel resources corresponding to the number of bits according to the performance of the system and resources of the system, for example, by setting $N_0$ to 0 with the number of bits being 2, $N_0$ to 0 or 1 with the number of bits being 3 and $N_0$ to 0 or 1 with the number of bits being 4.

The base station sets corresponding mapping tables for the number of bits of the response information being 2, 3 and 4, for example, Table 1-1, Table 1-2 and Table 1-3 below are mapping tables corresponding to the number of bits being 2, Table 2-1, Table 2-2, Table 2-3 and Table 2-4 below are mapping tables corresponding to the number of bits being 3, and Table 3-1, Table 3-2, Table 3-3, Table 3-4 and Table 3-5 below are mapping tables corresponding to the number of bits being 4. "HARQ(i)" in the respective tables represent response information corresponding to the i$^{th}$ data packet, "$n_{PUCCH}^{(1)}$" represents a channel resource on which a QPSK modulation symbol to characterize the response message is transmitted, and "b(0), (b1)" represents QPSK symbols to characterize the state of the response information, particularly four possible modulation symbols +1, −1, +j and −j, which can be represented as 4 states of a 2-bit binary number "00", "11", "10" and "01".

TABLE 1-1

| HARQ (0) | HARQ (1) | $n_{PCCH}^{(1)}$ | b(0), b(1) |
|---|---|---|---|
| ACK | ACK | $n_{PUCCH,1}^{(1)}$ | 1, 1 |
| ACK | NACK/DTX | $n_{PUCCH,0}^{(1)}$ | 0, 0 |
| NACK/DTX | ACK | $n_{PUCCH,1}^{(1)}$ | 1, 0 |
| NACK/DTX | NACK | $n_{PUCCH,1}^{(1)}$ | 0, 0 |
| NACK | DTX | $n_{PUCCH,0}^{(1)}$ | 1, 1 |
| DTX | DTX | N/A | N/A |

Each channel resource in Table 1-1 (e.g., $n_{PUCCH,0}^{(1)}$ and $n_{PUCCH,1}^{(1)}$) can be either a dynamic channel resource or a semi-static channel resource, i.e., $N_0=0$.

TABLE 1-2

| HARQ (0) | HARQ (1) | $n_{PUCCH}^{(1)}$ | b(0), b(1) |
|---|---|---|---|
| ACK | ACK | $n_{PUCCH,0}^{(1)}$ | 1, 1 |
| ACK | NACK/DTX | $n_{PUCCH,0}^{(1)}$ | 0, 1 |
| NACK/DTX | ACK | $n_{PUCCH,1}^{(1)}$ | 1, 0 |
| NACK/DTX | NACK | $n_{PUCCH,1}^{(1)}$ | 0, 1 |
| NACK | DTX | $n_{PUCCH,0}^{(1)}$ | 0, 0 |
| DTX | DTX | N/A | N/A |

Each channel resource in Table 1-2 (e.g., $n_{PUCCH,0}^{(1)}$ and $n_{PUCCH,1}^{(1)}$) can be either a dynamic channel resource or a semi-static channel resource, i.e., $N_0=0$.

TABLE 1-3

| HARQ (0) | HARQ (1) | $n_{PUCCH}^{(1)}$ | b(0), b(1) |
|---|---|---|---|
| ACK | ACK | $n_{PUCCH,0}^{(1)}$ | 1, 1 |
| ACK | NACK/DTX | $n_{PUCCH,0}^{(1)}$ | 0, 0 |
| NACK/DTX | ACK | $n_{PUCCH,1}^{(1)}$ | 0, 0 |
| NACK/DTX | NACK | $n_{PUCCH,1}^{(1)}$ | 1, 1 |
| NACK | DTX | | |
| DTX | DTX | N/A | N/A |

In Table 1-3 which is set with $n_{PUCCH,1}^{(1)}$ being a semi-static channel resource, i.e., $N_0=1$, each other resource can be either a dynamic channel resource or a semi-static channel resource.

TABLE 2-1

| HARQ (0) | HARQ (1) | HARQ (2) | $n_{PUCCH}^{(1)}$ | b(0), b(1) |
|---|---|---|---|---|
| ACK | ACK | ACK | $n_{PUCCH,2}^{(1)}$ | 1, 0 |
| ACK | ACK | NACK/DTX | $n_{PUCCH,1}^{(1)}$ | 0, 1 |
| ACK | NACK/DTX | ACK | $n_{PUCCH,0}^{(1)}$ | 1, 1 |
| ACK | NACK/DTX | NACK/DTX | $n_{PUCCH,0}^{(1)}$ | 0, 1 |
| NACK/DTX | ACK | ACK | $n_{PUCCH,2}^{(1)}$ | 1, 1 |
| NACK/DTX | ACK | NACK/DTX | $n_{PUCCH,1}^{(1)}$ | 0, 0 |
| NACK/DTX | NACK/DTX | ACK | $n_{PUCCH,2}^{(1)}$ | 0, 0 |
| DTX | DTX | NACK | $n_{PUCCH,2}^{(1)}$ | 0, 1 |
| DTX | NACK | NACK/DTX | $n_{PUCCH,1}^{(1)}$ | 1, 0 |
| NACK | NACK/DTX | NACK/DTX | $n_{PUCCH,0}^{(1)}$ | 0, 0 |
| DTX | DTX | DTX | N/A | N/A |

Each channel resource in Table 2-1 (e.g., $n_{PUCCH,0}^{(1)}$, $n_{PUCCH,1}^{(1)}$ and $n_{PUCCH,2}^{(1)}$) can be either a dynamic channel resource or a semi-static channel resource, i.e., $N_0=0$.

TABLE 2-2

| HARQ (0) | HARQ (1) | HARQ (2) | $n_{PUCCH}^{(1)}$ | b(0), b(1) |
|---|---|---|---|---|
| ACK | ACK | ACK | $n_{PUCCH,0}^{(1)}$ | 1, 1 |
| ACK | ACK | NACK/DTX | $n_{PUCCH,0}^{(1)}$ | 1, 0 |
| ACK | NACK/DTX | ACK | $n_{PUCCH,2}^{(1)}$ | 1, 0 |
| ACK | NACK/DTX | NACK/DTX | $n_{PUCCH,0}^{(1)}$ | 0, 1 |
| NACK/DTX | ACK | ACK | $n_{PUCCH,1}^{(1)}$ | 0, 1 |
| NACK/DTX | ACK | NACK/DTX | $n_{PUCCH,1}^{(1)}$ | 0, 0 |
| NACK/DTX | NACK/DTX | ACK | $n_{PUCCH,2}^{(1)}$ | 0, 0 |
| DTX | DTX | NACK | $n_{PUCCH,2}^{(1)}$ | 0, 1 |
| DTX | NACK | NACK/DTX | $n_{PUCCH,1}^{(1)}$ | 1, 0 |
| NACK | NACK/DTX | NACK/DTX | $n_{PUCCH,0}^{(1)}$ | 0, 0 |
| DTX | DTX | DTX | N/A | N/A |

Each channel resource in Table 2-2 (e.g., $n_{PUCCH,0}^{(1)}$, $n_{PUCCH,1}^{(1)}$ and $n_{PUCCH,2}^{(1)}$) can be either a dynamic channel resource or a semi-static channel resource, i.e., $N_0=0$.

TABLE 2-3

| HARQ (0) | HARQ (1) | HARQ (2) | $n_{PUCCH}^{(1)}$ | b(0), b(1) |
|---|---|---|---|---|
| ACK | ACK | ACK | $n_{PUCCH,1}^{(1)}$ | 1, 1 |
| ACK | ACK | NACK/DTX | $n_{PUCCH,0}^{(1)}$ | 1, 1 |
| ACK | NACK/DTX | ACK | $n_{PUCCH,0}^{(1)}$ | 0, 0 |
| ACK | NACK/DTX | NACK/DTX | $n_{PUCCH,0}^{(1)}$ | 1, 0 |
| NACK/DTX | ACK | ACK | $n_{PUCCH,1}^{(1)}$ | 0, 1 |
| NACK/DTX | ACK | NACK/DTX | $n_{PUCCH,1}^{(1)}$ | 0, 0 |
| NACK/DTX | NACK/DTX | ACK | $n_{PUCCH,2}^{(1)}$ | 1, 0 |
| DTX | DTX | NACK | $n_{PUCCH,2}^{(1)}$ | 0, 1 |
| DTX | NACK | NACK/DTX | | |
| NACK | NACK/DTX | NACK/DTX | | |
| DTX | DTX | DTX | N/A | N/A |

In Table 2-3 which is set with $n_{PUCCH,2}^{(1)}$ being a semi-static channel resource, i.e., $N_0=1$, each other resource can be either a dynamic channel resource or a semi-static channel resource.

TABLE 2-4

| HARQ (0) | HARQ (1) | HARQ (2) | $n_{PUCCH}^{(1)}$ | b(0), b(1) |
|---|---|---|---|---|
| ACK | ACK | ACK | $n_{PUCCH,0}^{(1)}$ | 1, 1 |
| ACK | ACK | NACK/DTX | $n_{PUCCH,1}^{(1)}$ | 1, 1 |
| ACK | NACK/DTX | ACK | $n_{PUCCH,0}^{(1)}$ | 1, 0 |
| ACK | NACK/DTX | NACK/DTX | $n_{PUCCH,0}^{(1)}$ | 0, 0 |
| NACK/DTX | ACK | ACK | $n_{PUCCH,1}^{(1)}$ | 0, 0 |
| NACK/DTX | ACK | NACK/DTX | $n_{PUCCH,1}^{(1)}$ | 0, 1 |
| NACK/DTX | NACK/DTX | ACK | $n_{PUCCH,2}^{(1)}$ | 1, 0 |
| DTX | DTX | NACK | $n_{PUCCH,2}^{(1)}$ | 0, 1 |
| DTX | NACK | NACK/DTX | | |
| NACK | NACK/DTX | NACK/DTX | | |
| DTX | DTX | DTX | N/A | N/A |

In Table 2-4 which is set with $n_{PUCCH,2}^{(1)}$ being a semi-static channel resource, i.e., $N_0=1$, each other resource can be either a dynamic channel resource or a semi-static channel resource.

TABLE 3-1

| HARQ (0) | HARQ (1) | HARQ (2) | HARQ (3) | $n_{PUCCH}^{(1)}$ | b(0), b(1) |
|---|---|---|---|---|---|
| ACK | ACK | ACK | ACK | $n_{PUCCH,0}^{(1)}$ | 1, 0 |
| ACK | ACK | ACK | NACK/DTX | $n_{PUCCH,0}^{(1)}$ | 1, 1 |
| ACK | ACK | NACK/DTX | ACK | $n_{PUCCH,1}^{(1)}$ | 0, 0 |
| ACK | ACK | NACK/DTX | NACK/DTX | $n_{PUCCH,1}^{(1)}$ | 0, 1 |
| ACK | NACK/DTX | ACK | ACK | $n_{PUCCH,0}^{(1)}$ | 0, 0 |
| ACK | NACK/DTX | ACK | NACK/DTX | $n_{PUCCH,0}^{(1)}$ | 0, 1 |
| ACK | NACK/DTX | NACK/DTX | ACK | $n_{PUCCH,3}^{(1)}$ | 1, 1 |
| ACK | NACK/DTX | NACK/DTX | NACK/DTX | $n_{PUCCH,3}^{(1)}$ | 1, 0 |

TABLE 3-1-continued

| HARQ (0) | HARQ (1) | HARQ (2) | HARQ (3) | $n_{PUCCH}^{(1)}$ | b(0), b(1) |
|---|---|---|---|---|---|
| NACK/DTX | ACK | ACK | ACK | $n_{PUCCH,2}^{(1)}$ | 0, 1 |
| NACK/DTX | ACK | ACK | NACK/DTX | $n_{PUCCH,2}^{(1)}$ | 0, 0 |
| NACK/DTX | ACK | NACK/DTX | ACK | $n_{PUCCH,1}^{(1)}$ | 1, 0 |
| NACK/DTX | ACK | NACK/DTX | NACK/DTX | $n_{PUCCH,1}^{(1)}$ | 1, 1 |
| NACK/DTX | NACK/DTX | ACK | ACK | $n_{PUCCH,2}^{(1)}$ | 1, 1 |
| NACK/DTX | NACK/DTX | ACK | NACK/DTX | $n_{PUCCH,2}^{(1)}$ | 1, 0 |
| NACK/DTX | NACK/DTX | NACK/DTX | ACK | $n_{PUCCH,3}^{(1)}$ | 0, 1 |
| DTX | DTX | DTX | NACK | $n_{PUCCH,3}^{(1)}$ | 0, 0 |
| DTX | DTX | NACK | NACK/DTX | | |
| DTX | NACK | NACK/DTX | NACK/DTX | | |
| NACK | NACK/DTX | NACK/DTX | NACK/DTX | | |
| DTX | DTX | DTX | DTX | N/A | N/A |

In Table 3-1 which is set with $n_{PUCCH,3}^{(1)}$ being a semi-static channel resource, i.e., $N_0=1$, each other resource can be either a dynamic channel resource or a semi-static channel resource.

TABLE 3-2

| HARQ (0) | HARQ (1) | HARQ (2) | HARQ (3) | $n_{PUCCH}^{(1)}$ | b(0), b(1) |
|---|---|---|---|---|---|
| ACK | ACK | ACK | ACK | $n_{PUCCH,0}^{(1)}$ | 1, 0 |
| ACK | ACK | ACK | NACK/DTX | $n_{PUCCH,0}^{(1)}$ | 1, 1 |
| ACK | ACK | NACK/DTX | ACK | $n_{PUCCH,0}^{(1)}$ | 0, 0 |
| ACK | ACK | NACK/DTX | NACK/DTX | $n_{PUCCH,0}^{(1)}$ | 0, 1 |
| ACK | NACK/DTX | ACK | ACK | $n_{PUCCH,2}^{(1)}$ | 0, 1 |
| ACK | NACK/DTX | ACK | NACK/DTX | $n_{PUCCH,2}^{(1)}$ | 0, 0 |
| ACK | NACK/DTX | NACK/DTX | ACK | $n_{PUCCH,3}^{(1)}$ | 1, 1 |
| ACK | NACK/DTX | NACK/DTX | NACK/DTX | $n_{PUCCH,3}^{(1)}$ | 1, 0 |
| NACK/DTX | ACK | ACK | ACK | $n_{PUCCH,1}^{(1)}$ | 0, 0 |
| NACK/DTX | ACK | ACK | NACK/DTX | $n_{PUCCH,1}^{(1)}$ | 0, 1 |
| NACK/DTX | ACK | NACK/DTX | ACK | $n_{PUCCH,1}^{(1)}$ | 1, 0 |
| NACK/DTX | ACK | NACK/DTX | NACK/DTX | $n_{PUCCH,1}^{(1)}$ | 1, 1 |
| NACK/DTX | NACK/DTX | ACK | ACK | $n_{PUCCH,2}^{(1)}$ | 1, 1 |
| NACK/DTX | NACK/DTX | ACK | NACK/DTX | $n_{PUCCH,2}^{(1)}$ | 1, 0 |
| NACK/DTX | NACK/DTX | NACK/DTX | ACK | $n_{PUCCH,3}^{(1)}$ | 0, 1 |
| DTX | DTX | DTX | NACK | $n_{PUCCH,3}^{(1)}$ | 0, 0 |
| DTX | DTX | NACK | NACK/DTX | | |
| DTX | NACK | NACK/DTX | NACK/DTX | | |
| NACK | NACK/DTX | NACK/DTX | NACK/DTX | | |
| DTX | DTX | DTX | DTX | N/A | N/A |

In Table 3-2 which is set with $n_{PUCCH,3}^{(1)}$ being a semi-static channel resource, i.e., $N_0=1$, each other resource can be either a dynamic channel resource or a semi-static channel resource.

TABLE 3-3

| HARQ (0) | HARQ (1) | HARQ (2) | HARQ (3) | $n_{PUCCH}^{(1)}$ | b(0), b(1) |
|---|---|---|---|---|---|
| ACK | ACK | ACK | ACK | $n_{PUCCH,0}^{(1)}$ | 1, 0 |
| ACK | ACK | ACK | NACK/DTX | $n_{PUCCH,0}^{(1)}$ | 1, 1 |
| ACK | ACK | NACK/DTX | ACK | $n_{PUCCH,0}^{(1)}$ | 0, 0 |
| ACK | ACK | NACK/DTX | NACK/DTX | $n_{PUCCH,0}^{(1)}$ | 0, 1 |

TABLE 3-3-continued

| HARQ (0) | HARQ (1) | HARQ (2) | HARQ (3) | $n_{PUCCH}^{(1)}$ | b(0), b(1) |
|---|---|---|---|---|---|
| ACK | NACK/DTX | ACK | ACK | $n_{PUCCH,2}^{(1)}$ | 0, 1 |
| ACK | NACK/DTX | ACK | NACK/DTX | $n_{PUCCH,3}^{(1)}$ | 1, 1 |
| ACK | NACK/DTX | NACK/DTX | ACK | $n_{PUCCH,2}^{(1)}$ | 0, 0 |
| ACK | NACK/DTX | NACK/DTX | NACK/DTX | $n_{PUCCH,3}^{(1)}$ | 1, 0 |
| NACK/DTX | ACK | ACK | ACK | $n_{PUCCH,1}^{(1)}$ | 0, 0 |
| NACK/DTX | ACK | ACK | NACK/DTX | $n_{PUCCH,1}^{(1)}$ | 0, 1 |
| NACK/DTX | ACK | NACK/DTX | ACK | $n_{PUCCH,1}^{(1)}$ | 1, 0 |
| NACK/DTX | ACK | NACK/DTX | NACK/DTX | $n_{PUCCH,1}^{(1)}$ | 1, 1 |
| NACK/DTX | NACK/DTX | ACK | ACK | $n_{PUCCH,2}^{(1)}$ | 1, 1 |
| NACK/DTX | NACK/DTX | ACK | NACK/DTX | $n_{PUCCH,3}^{(1)}$ | 0, 1 |
| NACK/DTX | NACK/DTX | NACK/DTX | ACK | $n_{PUCCH,2}^{(1)}$ | 1, 0 |
| DTX | DTX | DTX | NACK | $n_{PUCCH,3}^{(1)}$ | 0, 0 |
| DTX | DTX | NACK | NACK/DTX | | |
| DTX | NACK | NACK/DTX | NACK/DTX | | |
| NACK | NACK/DTX | NACK/DTX | NACK/DTX | | |
| DTX | DTX | DTX | DTX | N/A | N/A |

In Table 3-3 which is set with $n_{PUCCH,2}^{(1)}$ and $n_{PUCCH,3}^{(1)}$ being semi-static channel resources, i.e., $N_0=2$, each other resource can be either a dynamic channel resource or a semi-static channel resource.

TABLE 3-4

| HARQ (0) | HARQ (1) | HARQ (2) | HARQ (3) | $n_{PUCCH}^{(1)}$ | b(0), b(1) |
|---|---|---|---|---|---|
| ACK | ACK | ACK | ACK | $n_{PUCCH,0}^{(1)}$ | 1, 0 |
| ACK | ACK | ACK | NACK/DTX | $n_{PUCCH,1}^{(1)}$ | 0, 0 |
| ACK | ACK | NACK/DTX | ACK | $n_{PUCCH,0}^{(1)}$ | 1, 1 |
| ACK | ACK | NACK/DTX | NACK/DTX | $n_{PUCCH,3}^{(1)}$ | 0, 1 |
| ACK | NACK/DTX | ACK | ACK | $n_{PUCCH,0}^{(1)}$ | 0, 0 |
| ACK | NACK/DTX | ACK | NACK/DTX | $n_{PUCCH,3}^{(1)}$ | 1, 1 |
| ACK | NACK/DTX | NACK/DTX | ACK | $n_{PUCCH,0}^{(1)}$ | 0, 1 |
| ACK | NACK/DTX | NACK/DTX | NACK/DTX | $n_{PUCCH,3}^{(1)}$ | 1, 0 |
| NACK/DTX | ACK | ACK | ACK | $n_{PUCCH,2}^{(1)}$ | 0, 1 |
| NACK/DTX | ACK | ACK | NACK/DTX | $n_{PUCCH,1}^{(1)}$ | 1, 0 |
| NACK/DTX | ACK | NACK/DTX | ACK | $n_{PUCCH,2}^{(1)}$ | 0, 0 |
| NACK/DTX | ACK | NACK/DTX | NACK/DTX | $n_{PUCCH,1}^{(1)}$ | 1, 1 |
| NACK/DTX | NACK/DTX | ACK | ACK | $n_{PUCCH,2}^{(1)}$ | 1, 1 |
| NACK/DTX | NACK/DTX | ACK | NACK/DTX | $n_{PUCCH,3}^{(1)}$ | 0, 1 |
| NACK/DTX | NACK/DTX | NACK/DTX | ACK | $n_{PUCCH,2}^{(1)}$ | 1, 0 |
| DTX | DTX | DTX | NACK | $n_{PUCCH,3}^{(1)}$ | 0, 0 |
| DTX | DTX | NACK | NACK/DTX | | |
| DTX | NACK | NACK/DTX | NACK/DTX | | |
| NACK | NACK/DTX | NACK/DTX | NACK/DTX | | |
| DTX | DTX | DTX | DTX | N/A | N/A |

In Table 3-4 which is set with $n_{PUCCH,2}^{(1)}$ and $n_{PUCCH,3}^{(1)}$ being semi-static channel resources, i.e., $N_0=2$, each other resource can be either a dynamic channel resource or a semi-static channel resource.

TABLE 3-5

| HARQ (0) | HARQ (1) | HARQ (2) | HARQ (3) | $n_{PUCCH}^{(1)}$ | b(0), b(1) |
|---|---|---|---|---|---|
| ACK | ACK | ACK | ACK | $n_{PUCCH,0}^{(1)}$ | 0, 0 |
| ACK | ACK | ACK | NACK/DTX | $n_{PUCCH,0}^{(1)}$ | 0, 1 |
| ACK | ACK | NACK/DTX | ACK | $n_{PUCCH,0}^{(1)}$ | 1, 0 |
| ACK | ACK | NACK/DTX | NACK/DTX | $n_{PUCCH,0}^{(1)}$ | 1, 1 |
| ACK | NACK/DTX | ACK | ACK | $n_{PUCCH,2}^{(1)}$ | 1, 1 |
| ACK | NACK/DTX | ACK | NACK/DTX | $n_{PUCCH,2}^{(1)}$ | 1, 0 |
| ACK | NACK/DTX | NACK/DTX | ACK | $n_{PUCCH,2}^{(1)}$ | 0, 1 |
| ACK | NACK/DTX | NACK/DTX | NACK/DTX | $n_{PUCCH,2}^{(1)}$ | 0, 0 |
| NACK/DTX | ACK | ACK | ACK | $n_{PUCCH,1}^{(1)}$ | 1, 0 |
| NACK/DTX | ACK | ACK | NACK/DTX | $n_{PUCCH,1}^{(1)}$ | 1, 1 |
| NACK/DTX | ACK | NACK/DTX | ACK | $n_{PUCCH,1}^{(1)}$ | 0, 0 |
| NACK/DTX | ACK | NACK/DTX | NACK/DTX | $n_{PUCCH,1}^{(1)}$ | 0, 1 |
| NACK/DTX | NACK/DTX | ACK | ACK | $n_{PUCCH,3}^{(1)}$ | 0, 1 |
| NACK/DTX | NACK/DTX | ACK | NACK/DTX | $n_{PUCCH,3}^{(1)}$ | 0, 0 |
| NACK/DTX | NACK/DTX | NACK/DTX | ACK | $n_{PUCCH,3}^{(1)}$ | 1, 1 |
| DTX | DTX | DTX | NACK | $n_{PUCCH,3}^{(1)}$ | 1, 0 |
| DTX | DTX | NACK | NACK/DTX | | |
| DTX | NACK | NACK/DTX | NACK/DTX | | |
| NACK | NACK/DTX | NACK/DTX | NACK/DTX | | |
| DTX | DTX | DTX | DTX | N/A | N/A |

In Table 3-5 which is set with $n_{PUCCH,2}^{(1)}$ and $n_{PUCCH,3}^{(1)}$ being semi-static channel resources, i.e., $N_0=2$, each other resource can be either a dynamic channel resource or a semi-static channel resource.

Table 1-1 to Table 3-5 above are merely several mapping tables listed in the embodiments of the invention, and those skilled in the art can extended the mapping tables listed in the embodiments of the invention to numerous mapping tables, which will not be enumerated here. Any mapping table accommodating the maximized distance between codewords can be encompassed in the claimed scope of the invention.

A detailed description will be given below respectively in three embodiments for scenarios with the number of bits of response information being 2, 3 and 4, and a UE can transmit the corresponding numbers of bits using the PUCCH Format 1b with channel selection in all of these three embodiments.

First Embodiment

In this first embodiment, a detailed description will be given of a solution to allocation of a control channel resource according to the technical solution of the invention taking as an example the number of bits of response information being 2. $N_0=0$ is preconfigured by higher-layer signaling, or a base station and a UE predefine $N_0=0$.

For scenarios illustrated in FIG. 6A, FIG. 6B, FIG. 6C and FIG. 6D, the UE may obtain two dynamic channel resources, i.e., K=2, on a corresponding UL PCC according to PDCCHs on a DL CC1 (this DL CC1 is a DL PCC) when the UE supports across-carrier scheduling, i.e., across-carrier PDCCH scheduling on the DL PCC, that is, scheduling of all the data packets is performed from the PDCCHs on the DL PCC; and at this time, with $K=(M-N_0)$, $S=K=2$ can be determined, and the UE requires no semi-static channel resource, so the UE can select one channel resource and one QPSK modulation symbol from the mapping table depicted in Table 1-1 or Table 1-2 and transmits the selected QPSK modulation symbol on the selected channel resource.

For the scenarios illustrated in FIG. 6A, FIG. 6B, FIG. 6C and FIG. 6D, the UE may obtain one dynamic channel resource, i.e., K=1, on the corresponding UL PCC according to the PDCCH on the DL CC1 (the DL CC1 is a DL PCC) when the UE supports no across-carrier scheduling, that is, a PDCCH on each DL CC schedules only transmission of a PDSCH on the DL CC; and at this time, with $K<(M-N_0)$, $S=K=1$ can be determined, that is, the UE requires one semi-static channel resource (this semi-static channel resource can be configured directly by higher-layer signaling or one selected among a plurality of semi-static channel resources configured by higher-layer signaling and indicated to the UE on a PDCCH on a DL CC2). In other words, the UE uses one dynamic channel resource and one semi-static channel resource, selects one channel resource and QPSK modulation symbol for the 2-bit response information to be fed back from the mapping table depicted in Table 1-3 and transmits the selected QPSK modulation symbol on the selected channel resource. Since Table 1-1 and Table 1-2 each can be compatible with a second channel being a semi-static channel resource, the UE can also select one channel resource and QPSK modulation symbol for the 2-bit response information to be fed back from the mapping table depicted in Table 1-1 or Table 1-2.

Figure 6A:
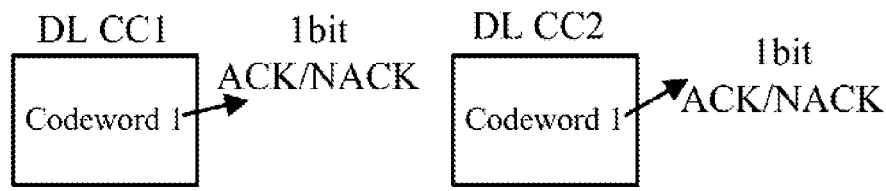
FIG. 6A, FIG. 6B, FIG. 6C and FIG. 6D illustrate application scenarios where 2-bit response information is fed back in embodiments of the invention.
Figure 6B:
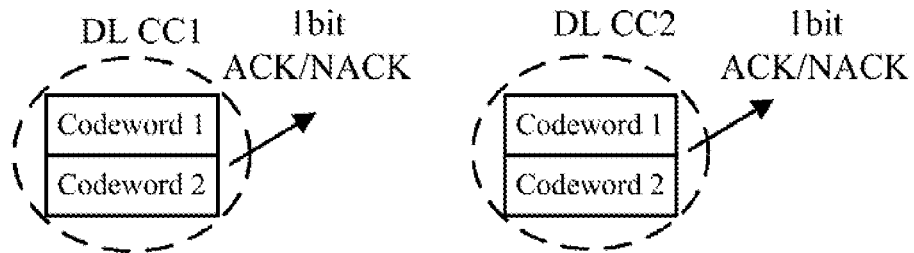
Figure 6C:
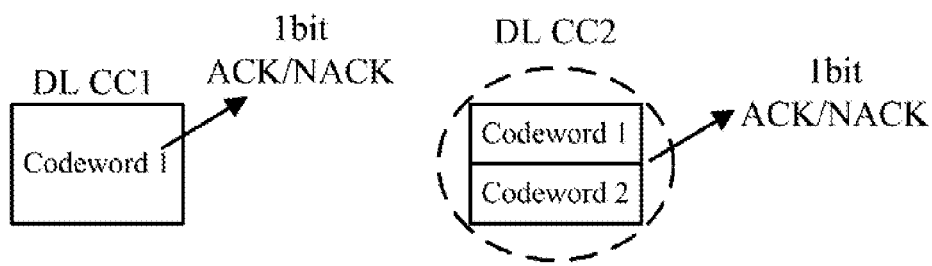
Figure 6D:
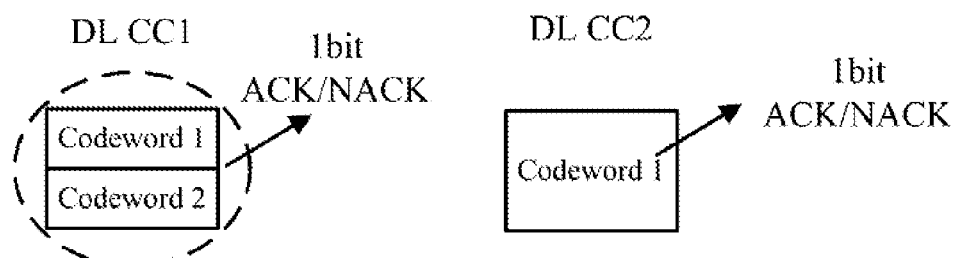

For the scenarios illustrated in FIG. 6B and FIG. 6C, when the UE supports no across-carrier scheduling and may obtain two dynamic channel resources on the corresponding UL PCC according to one PDCCH on the DL PCC scheduling multiple codewords, the UE can obtain two dynamic channel resources on the corresponding UL PCC, i.e., $K=2$, according to the PDCCH on the DL CC1 (the DL CC1 is a DL PCC). At this time, with $K=(M-N_0)$, $S=K=2$ can be determined, and the UE requires no semi-static channel resource, so the UE can select one channel resource and one QPSK modulation symbol from the mapping table depicted in Table 1-1 or Table 1-2 and transmit the selected QPSK modulation symbol on the selected channel resource.

Second Embodiment

In this second embodiment, a detailed description will be given of a solution to allocation of a control channel resource according to the technical solution of the invention taking as an example the number of bits of response information being 3. $N_0=1$ is preconfigured by higher-layer signaling, or a base station and a UE predefine $N_0=1$.

Figure 7A:
FIG. 7A, FIG. 7B, FIG. 7C and FIG. 7D illustrate application scenarios where 3-bit response information is fed back in embodiments of the invention.
Figure 7B:
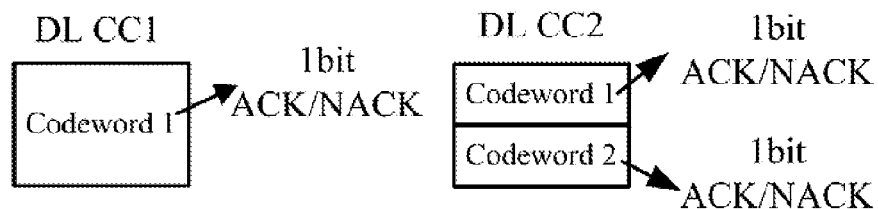

For scenarios illustrated in FIG. 7A and FIG. 7B, the UE may obtain two dynamic channel resources, i.e., $K=2$, on a corresponding UL PCC according to PDCCHs on a DL CC1 (this DL CC1 is a DL PCC) when the UE supports across-carrier scheduling, i.e., across-carrier PDCCH scheduling on the DL PCC, that is, scheduling of all the data packets is performed from the PDCCHs on the DL PCC; and at this time, with $K=(M-N_0)$, $S=K=2$ can be determined, and the UE requires a number $N=(M-S)=1$ of semi-static channel resources, that is, the UE requires two dynamic channel resources and one semi-static channel resource for feeding back the 3-bit response information, and the semi-static channel resource can be configured directly by higher-layer signaling or one semi-static channel resource selected among a plurality of semi-static channel resources configured by higher-layer signaling and indicated to the UE on PDCCHs, where a plurality of PDCCHs shall indicate a consistent channel resource. For the sake of improved transmission performance, the UE shall select one channel resource and one QPSK modulation symbol for the 3-bit response information to be fed back preferentially from the mapping table depicted in Table 2-3 or Table 2-4 and transmit the selected QPSK modulation symbol on the selected channel resource. Since the mapping table depicted in Table 2-1 or Table 2-2 each can be compatible with the last channel being a semi-static channel resource, the UE can also select one channel resource and QPSK modulation symbol for the 3-bit response information to be fed back from the mapping table depicted in Table 2-1 or Table 2-2.

For the scenario illustrated in FIG. 7A, FIG. 7B, FIG. 7C or FIG. 7D, the UE may obtain one dynamic channel resource, i.e., $K=1$, on the corresponding UL PCC according to the PDCCH on the DL CC1 (the DL CC1 is a DL PCC) when the UE supports no across-carrier scheduling, that is, a PDCCH on each DL CC schedules only transmission of a PDSCH on the DL CC; and at this time, with $K<(M-N_0)$, $S=K=1$ and $N=(M-S)=2$ can be determined, and the UE requires two semi-static channel resources (these semi-static channel resource can be configured directly by higher-layer signaling or two ones selected among a plurality of semi-static channel resources configured by higher-layer signaling and indicated to the UE on a PDCCH on a DL CC2), where a plurality of PDCCHs shall indicate consistent channel resources. The UE requires one dynamic channel resource and two semi-static channel resources, and since the mapping table depicted in Table 2-1, Table 2-2, Table 2-3 or Table 2-4 each can be compatible with the last two channels being semi-static channel resources, the UE can select one channel resource and one QPSK modulation symbol for the 3-bit response information to be fed back from the mapping table depicted in Table 2-1, Table 2-2, Table 2-3 or Table 2-4 and transmit the selected QPSK modulation symbol on the selected channel resource. Preferably the UE shall select preferentially from the mapping table depicted in Table 2-3 or Table 2-4 for the sake of improved transmission performance.

Figure 7C:
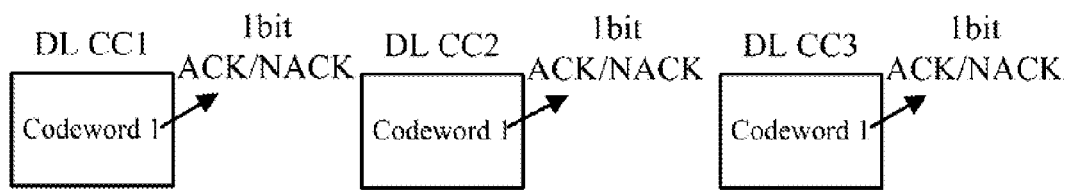
Figure 7D:
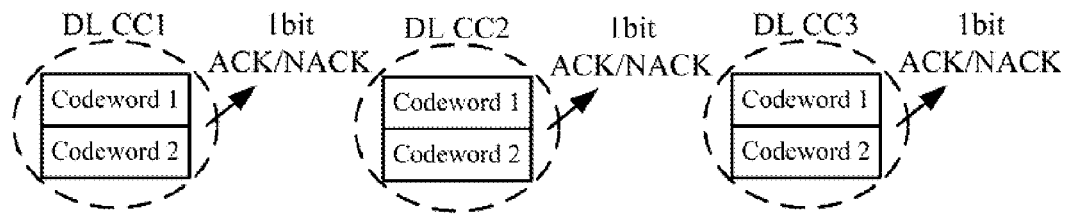

For the scenario illustrated in FIG. 7C or FIG. 7D, the UE may obtain three dynamic channel resources, i.e., $K=3$, on a corresponding UL PCC according to PDCCHs on a DL CC1 (this DL CC1 is a DL PCC) when the UE supports across-carrier scheduling, i.e., across-carrier PDCCH scheduling on the DL PCC, that is, scheduling of all the data packets is performed from the PDCCHs on the DL PCC; and at this time, with $K>(M-N_0)$, $S=(M-N_0)=2$ and the number of semi-static channel resources $N=(M-S)=1$ can be determined, that is, the UE requires two dynamic channel resources and one semi-static channel resource for feeding back the 3-bit response information, and the semi-static channel resource can be configured directly by higher-layer signaling or one semi-static channel resource selected among a plurality of semi-static channel resources configured by higher-layer signaling and indicated to the UE on PDCCHs, where a plurality of PDCCHs shall indicate a consistent channel resource. For the sake of improved transmission performance, the UE shall select one channel resource and one QPSK modulation symbol for the 3-bit response information to be fed back preferentially from the mapping table depicted in Table 2-3 or Table 2-4 and transmit the selected QPSK modulation symbol on the selected channel resource. Since the mapping table depicted in Table 2-1 or Table 2-2 each can be compatible with the last channel being a semi-static channel resource, the UE can also select one channel resource and QPSK modulation symbol for the 3-bit response information to be fed back from the mapping table depicted in Table 2-1 or Table 2-2.

For the scenario illustrated in FIG. 7A or FIG. 7D, when the UE can obtain two dynamic channel resources on the corresponding UL PCC according to one PDCCH scheduling multiple codewords on the DL PCC, the UE can obtain and use one more dynamic channel resource than what would otherwise be obtained in the foregoing respective scenarios and feed back the 3-bit response information in the same way.

Third Embodiment

In this third embodiment, a detailed description will be given of a solution to allocation of a control channel resource according to the technical solution of the invention taking as an example the number of bits of response information being 4. $N_0=1$ is preconfigured by higher-layer signaling, or a base station and a UE predefine $N_0=1$.

Figure 8A:
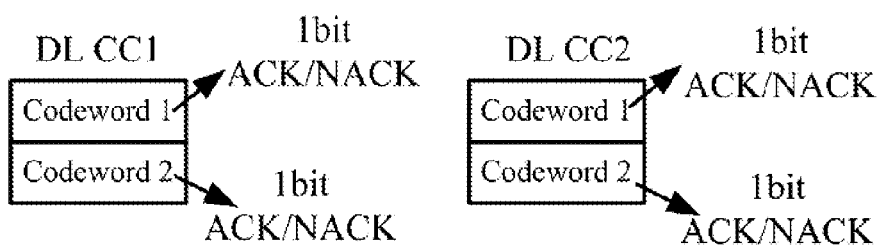
FIG. 8A, FIG. 8B and FIG. 8C illustrate application scenarios where 4-bit response information is fed back in embodiments of the invention.

For a scenario illustrated in FIG. 8A, the UE may obtain two dynamic channel resources, i.e., K=2, on a corresponding UL PCC according to PDCCHs on a DL CC1 (this DL CC1 is a DL PCC) when the UE supports across-carrier scheduling, i.e., across-carrier PDCCH scheduling on the DL PCC, that is, scheduling of all the data packets is performed from the PDCCHs on the DL PCC; and at this time, with $K<(M-N_0)$, S=K=2 can be determined, and the UE requires a number N=(M-S)=2 of semi-static channel resources, that is, the UE requires two dynamic channel resources and two semi-static channel resources for feeding back the 4-bit response information, and the semi-static channel resources can be configured directly by higher-layer signaling or two semi-static channel resources selected among a plurality of semi-static channel resources configured by higher-layer signaling and indicated to the UE on PDCCHs, where a plurality of PDCCHs shall indicate consistent channel resources. Since the mapping table depicted in Table 3-1, Table 3-2, Table 3-3, Table 3-4 or Table 3-5 each can be compatible with the last two channels being semi-static channel resources, the UE can select one channel resource and one QPSK modulation symbol for the 4-bit response information to be fed back from the mapping table depicted in Table 3-1, Table 3-2, Table 3-3, Table 3-4 or Table 3-5 and transmit the selected QPSK modulation symbol on the selected channel resource. Preferably the UE shall select preferentially from the mapping table depicted in Table 3-1 or Table 3-2 for the sake of an improved utilization ratio of resources.

Figure 8B:
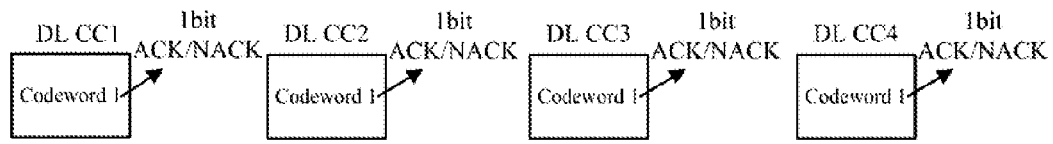
Figure 8C:
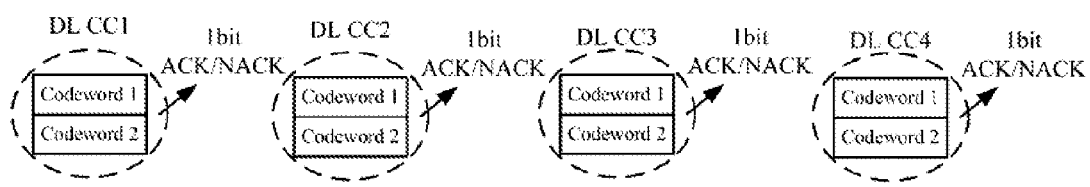

For the scenario illustrated in FIG. 8A, FIG. 8B or FIG. 8C, the UE may obtain one dynamic channel resource, i.e., K=1, on the corresponding UL PCC according to the PDCCH on the DL CC1 (the DL CC1 is a DL PCC) when the UE supports no across-carrier scheduling, that is, a PDCCH on each DL CC schedules only transmission of a PDSCH on the DL CC; and at this time, with $K<(M-N_0)$, S=K=1 and N=(M-S)=3 can be determined, and the UE requires three semi-static channel resources (these semi-static channel resource can be configured directly by higher-layer signaling or three ones selected among a plurality of semi-static channel resources configured by higher-layer signaling and indicated to the UE on a PDCCH on a DL CC2), where a plurality of PDCCHs shall indicate consistent channel resources. The UE requires one dynamic channel resource and three semi-static channel resources, and since the mapping table depicted in Table 3-1, Table 3-2, Table 3-3, Table 3-4 or Table 3-5 each can be compatible with the last three channels being semi-static channel resources, the UE can select one channel resource and one QPSK modulation symbol for the 4-bit response information to be fed back from the mapping table depicted in Table 3-1, Table 3-2, Table 3-3, Table 3-4 or Table 3-5 and transmit the selected QPSK modulation symbol on the selected channel resource. Preferably the UE shall select preferentially from the mapping table depicted in Table 3-1 or Table 3-2 for the sake of an improved utilization ratio of resources.

For the scenario illustrated in FIG. 8B or FIG. 8C, the UE may obtain three dynamic channel resources, i.e., K=3, on a corresponding UL PCC according to the PDCCHs on the DL CC1 (this DL CC1 is a DL PCC) when the UE supports across-carrier scheduling, i.e., across-carrier PDCCH scheduling on the DL PCC, and the PDCCHs on the DL PCC can schedule a DL CC2 and a DL CC3, and a PDCCH on a DL CC4 schedules a PDSCH of the DL CC4; and at this time, with $K=(M-N_0)$, S=K=3 and N=(M-S)=1 can be determined, that is, the UE requires three dynamic channel resources and one semi-static channel resource for feeding back the 4-bit response information, and the semi-static channel resource can be configured directly by higher-layer signaling or one semi-static channel resource selected among a plurality of semi-static channel resources configured by higher-layer signaling and indicated to the UE on PDCCHs, where a plurality of PDCCHs shall indicate a consistent channel resource. The UE can select one channel resource and one QPSK modulation symbol for the 4-bit response information to be fed back from the mapping table depicted in Table 3-1 or Table 3-2 and transmit the selected QPSK modulation symbol on the selected channel resource.

For the scenario illustrated in FIG. 8B or FIG. 8C, the UE may obtain four dynamic channel resources, i.e., K=4, on the corresponding UL PCC according to the PDCCHs on the DL CC1 (this DL CC1 is a DL PCC) when the UE supports across-carrier scheduling, i.e., across-carrier PDCCH scheduling on the DL PCC, and the PDCCHs on the DL PCC can schedule the DL CC2, the DL CC3 and the DL CC4; and at this time, with $K>(M-N_0)$, $S=(M-N_0)=3$ and $N=N_0=1$ can be determined, that is, the UE requires three dynamic channel resources and one semi-static channel resource for feeding back the 4-bit response information, and the semi-static channel resource can be configured directly by higher-layer signaling or one semi-static channel resource selected among a plurality of semi-static channel resources configured by higher-layer signaling and indicated to the UE on PDCCHs, where a plurality of PDCCHs shall indicate a consistent channel resource. The UE can select one channel resource and one QPSK modulation symbol for the 4-bit response information to be fed back from the mapping table depicted in Table 3-1 or Table 3-2 and transmit the selected QPSK modulation symbol on the selected channel resource.

For the scenario illustrated in FIG. 8A or FIG. 8C, when the UE can obtain two dynamic channel resources on the corresponding UL PCC according to one PDCCH scheduling multiple codewords on the DL PCC, the UE can obtain and use one more dynamic channel resource than what would otherwise be obtained in the foregoing respective scenarios and feed back the 4-bit response information in the same way.

Figure 9:
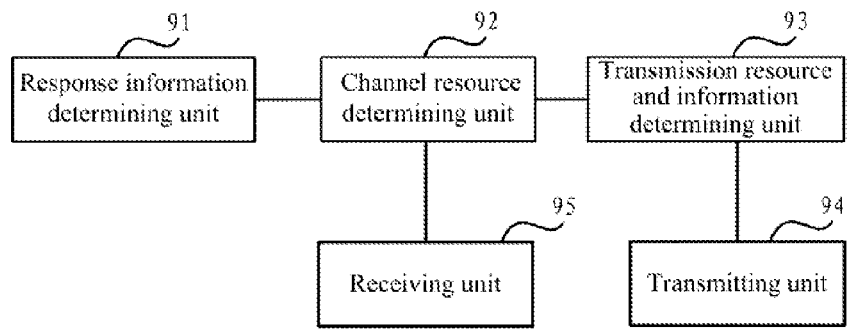
FIG. 9 is a schematic structural diagram of a base station in an embodiment of the invention.
Figure 10:
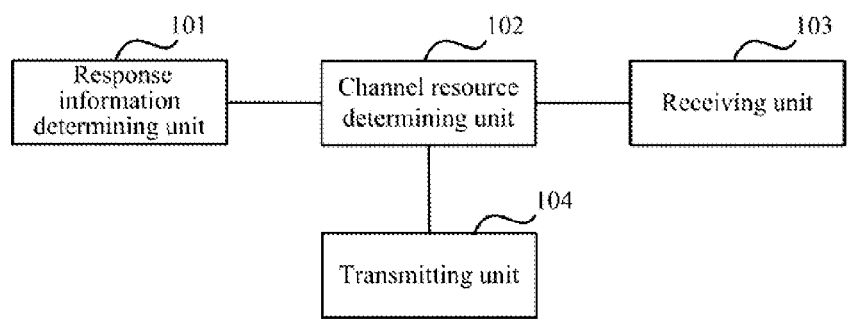
FIG. 10 is a schematic structural diagram of a user equipment in an embodiment of the invention.

Based upon the same inventive idea, embodiments of the invention further provide a user equipment and a base station in corresponding structures as illustrated in FIG. 9 and FIG. 10.

Referring to FIG. 9 which is a schematic structural diagram of a user equipment in an embodiment of the invention, the user equipment includes:

a response information determining unit 91 configured to determine K-bit response information to be fed back;

a channel resource determining unit 92 configured to determine M candidate channel resources including L dynamic channel resources and N semi-static channel resources, where M=(L+N), $0 \le N \le M$, $(M-N) \le L \le M$, and M, L and N are integers;

a transmission resource and information determining unit 93 configured to select at least one of the M candidate channel resources, determined by the channel resource determining unit 92, and to select identification information to characterize the response information to be fed back; and a transmitting unit 94 configured to transmit the identification information to characterize the response information to be fed back on the channel resource selected by the transmission resource and information determining unit 93.

Preferably the user equipment further includes:

a receiving unit 95, connected with the channel resource determining unit 92, configured to receive the N semi-static channel resources configured by higher-layer signaling or to receive T semi-static channel resources configured by higher-layer signaling and a Physical Downlink Control Channel (PDCCH) to indicate the N semi-static channel resources among the T semi-static channel resources. Preferably the PDCCH received by the receiving unit to indicate the semi-static channel resources is transmitted on a Down Link Secondary Component Carrier (DL SCC) of the UE to schedule a Physical Downlink Shared Channel (PDSCH) on the DL SCC.

Preferably the channel resource determining unit 92 is particularly configured to determine the L dynamic channel resources from the indexes of Control Channel Elements (CCEs) of PDCCHs transmitted on a Down Link Primary Component Carrier (DL PCC) of the UE. Preferably the PDCCHs from which the channel resource determining unit determines the L dynamic channel resources include a PDCCH for scheduling a PDSCH transmitted on the DL PCC of the UE, a PDCCH for scheduling a PDSCH transmitted on a DL SSC of the UE and a PDCCH transmitted on the DL PCC of the UE to instruct a downlink Semi-Persistently Scheduled (SPS) resource to be released.

Preferably the channel resource determining unit 92 is further configured to determine S dynamic channel resources according to the PDCCHs and to select the L dynamic channel resources from the S dynamic channel resources as the candidate channel resources particularly as follows:

With $S>(M-N_0)$, $L=(M-N_0)$ and $N=N_0$ are determined, and the channel resource determining unit selects $(M-N_0)$ dynamic channel resources from the S dynamic channel resources, where $N_o$ is the smallest number of semi-static channel resources, configured by higher-layer signaling or predefined between a base station and the UE, for transmission of the K-bit response information to be fed back, and $0 \leq N_0 \leq M$; and With $S \leq (M-N_0)$, $L=S$ and $N=(M-S)$ are determined, where S is a nonnegative integer.

Preferably the transmitting unit 904 is particularly configured to transmit the identification information to characterize the response information to be fed back using the Physical Uplink Control Channel (PUCCH) format 1b on the channel resource selected by the transmission resource and information determining unit.

Referring to FIG. 10 which is a schematic structural diagram of a base station in an embodiment of the invention, the base station includes:

a response information determining unit 101 configured to determine the number of bits of response information to be fed back from a UE as K;

a channel resource determining unit 102 configured to determine M channel resources to be detected including L dynamic channel resources and N semi-static channel resources, where $M=(L+N)$, $0 \leq N \leq M$, $(M-N) \leq L \leq M$ and M, L and N are integers; and a receiving unit 103 configured to obtain identification information transmitted from the UE to characterize the response information on the channel resources to be detected and to obtain the response information.

Preferably the base station further includes:

a transmitting unit 104 configured to transmit preset N semi-static channel resources to the UE or to transmit preset T semi-static channel resources to the UE and a Physical Downlink Control Channel (PDCCH) to the user equipment to indicate the N semi-static channel resources among the T semi-static channel resources. Preferably the PDCCH transmitted from the transmitting unit to indicate the semi-static channel resources is transmitted on a Down Link Secondary Component Carrier (DL SCC) of the UE to schedule a Physical Downlink Shared Channel (PDSCH) on the DL SCC.

Preferably the channel resource determining unit 102 determines the L dynamic channel resources particularly from the indexes of Control Channel Elements (CCEs) of PDCCHs transmitted on a Down Link Primary Component Carrier (DL PCC) of the UE. Preferably the PDCCHs from which the channel resource determining unit determines the L dynamic channel resources include a PDCCH for scheduling a PDSCH transmitted on the DL PCC of the UE, a PDCCH for scheduling a PDSCH transmitted on a DL SSC of the UE and a PDCCH transmitted on the DL PCC of the UE to instruct a downlink Semi-Persistently Scheduled (SPS) resource to be released.

Preferably the channel resource determining unit 102 is further configured to determine S dynamic channel resources according to the PDCCHs and to select the L dynamic channel resources from the S dynamic channel resources as the channel resources to be detected particularly as follows:

With $S>(M-N_0)$, $L=(M-N_0)$ and $N=N_0$ are determined, and the channel resource determining unit 102 selects $(M-N_0)$ dynamic channel resources from the S dynamic channel resources, where $N_0$ is the smallest number of semi-static channel resources, configured by higher-layer signaling or predefined between the base station and the UE, for transmission of the K-bit response information, and $0 \leq N_0 \leq M$; and With $S \leq (M-N_0)$, $L=S$ and $N=(M-S)$ are determined, where S is a nonnegative integer.

Preferably the transmitting unit 103 is particularly configured to receive the identification information to characterize the response information using the Physical Uplink Control Channel (PUCCH) format 1b on the channel resources to be detected.

In the embodiments of the invention, a user equipment transmits response information to be fed back on both a dynamic channel resource and a semi-static channel resource to thereby improve the performance of a system and the throughput of a system to some extent while taking a resource overhead of the system into account, thus overcoming the problem of a degraded performance of the system and a lowered throughput of the system due to the use of only a dynamic channel resource and the problem of an excessive resource overhead of the system due to the use of only a semi-static channel resource for transmission of the response information to be fed back in the prior art; and on the other hand, the same mapping table is stored at both a base station and the user equipment, and upon determination of the state of the response information to be fed back, the user equipment selects from the mapping table a QPSK modulation symbol to characterize the response information and a channel resource for transmitting the QPSK modulation symbol and transmits the selected QPSK modulation symbol on the selected channel resource; and the base station receives the QPSK modulation symbol on the selected channel resource and determines the corresponding response information from the stored mapping table according to the QPSK modulation symbol to thereby improve the efficiency and accuracy at which the base station determines the response information.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for transmitting response information, comprising:
   a User Equipment, UE, determining K-bit response information to be fed back and determining M candidate channel resources comprising L dynamic channel resources and N semi-static channel resources, wherein $M=(L+N)$, $0 \leq N \leq M$, $(M-N) \leq L \leq M$, and M, L and N are integers;
   the UE selecting at least one of the M candidate channel resources and selecting identification information to characterize the response information to be fed back; and
   the UE transmitting the selected identification information to characterize the response information to be fed back on each selected channel resource.

2. The method of claim 1, wherein the N semi-static channel resources are N channel resources configured by higher-layer signaling; or
   the N semi-static channel resources are N channel resources selected among T channel resources configured by higher-layer signaling, and these N semi-static channel resources are indicated by a Physical Downlink Control Channel, PDCCH, wherein $T \geq N$; and
   wherein the PDCCH is transmitted on a Down Link Secondary Component Carrier, DL SCC, of the UE to schedule a Physical Downlink Shared Channel, PDSCH, on the DL SCC.

3. The method of claim 1, wherein the L dynamic channel resources are particularly determined by the UE from the indexes of Control Channel Elements, CCEs, of PDCCHs transmitted on a Down Link Primary Component Carrier, DL PCC.

4. The method of claim 1, further comprising:
   the UE determining S dynamic channel resources from the indexes of CCEs of PDCCHs transmitted on a DL PCC and selecting the L dynamic channel resources from the S dynamic channel resources, wherein S is a nonnegative, integer, as the candidate channel resources particularly as follows:
   with $S>(M-N_0)$, $L=(M-N_0)$ and $N=N_0$ are determined, and the UE selects $(M-N_0)$ dynamic channel resources from the S dynamic channel resources, wherein $N_0$ is the smallest number of semi-static channel resources, configured by higher-layer signaling or predefined between a base station and the UE, for transmission of the K-bit response information to be fed back, and $0 \leq N_0 \leq M$; and
   with $S \leq (M-N_0)$, $L=S$ and $N=(M-S)$ are determined.

5. The method of claim 1, wherein the UE transmits the identification information to characterize the response information to be fed back using the Physical Uplink Control Channel, PUCCH, format 1b on each selected channel resource; and
   wherein the identification information to characterize the response information to be fed back is a Quadrature Phase Shift Keying, QPSK, modulation symbol.

6. A method for transmitting response information, comprising:
   a base station determining response information to be fed back from a UE as K bits
   the base station determining as M the number of channel resources to be detected including L dynamic channel resources and N semi-static channel resources, wherein $M=(L+N)$, $0 \leq N \leq M$, $(M-N) \leq L \leq M$, and M, L and N are integers; and
   the base station detecting the M channel resources to be detected, obtaining identification information to characterize the response information and obtaining the response information.

7. The method of claim 6, wherein the N semi-static channel resources are N channel resources configured by higher-layer signaling; or
   the N semi-static channel resources are N channel resources selected among T channel resources configured by higher-layer signaling, and these N semi-static channel resources are indicated by a Physical Downlink Control Channel, PDCCH, wherein $T \geq N$; and
   wherein the PDCCH is transmitted on a Down Link Secondary Component Carrier, DL SCC, of the UE to schedule a Physical Downlink Shared Channel, PDSCH, on the DL SCC.

8. The method of claim 6, wherein the L dynamic channel resources are particularly determined by the base station from the indexes of Control Channel Elements, CCEs, of PDCCHs transmitted on a Down Link Primary Component Carrier, DL PCC of the UE.

9. The method of claim 6, further comprising:
   the base station determining S dynamic channel resources from the indexes of CCEs of PDCCHs transmitted on a DL PCC and selecting the L dynamic channel resources from the S dynamic channel resources, wherein S is a nonnegative integer, as the channel resources to be detected particularly as follows:
   with $S>(M-N_0)$, $L=(M-N_0)$ and $N=N_0$ are determined, and the base station selects $(M-N_0)$ dynamic channel resources from the S dynamic channel resources, wherein $N_0$ is the smallest number of semi-static channel resources, configured by higher-layer signaling or predefined between the base station and the UE, for transmission of the K-bit response information, and $0 \leq N_0 \leq M$; and
   with $S \leq (M-N_0)$, $L=S$ and $N=(M-S)$ are determined.

10. The method of claim 6, wherein the base station receives the identification information to characterize the response information using the Physical Uplink Control Channel, PUCCH, format 1b on the channel resources to be detected; and
    wherein the identification information to characterize the response information is a Quadrature Phase Shift Keying, QPSK, modulation symbol.

11. A user equipment, comprising:
    a response information determining unit configured to determine K-bit response information to be fed back;
    a channel resource determining unit configured to determine M candidate channel resources including L dynamic channel resources and N semi-static channel resources, wherein $M=(L+N)$, $0 \leq N \leq M$, $(M-N) \leq L \leq M$, and M, L and N are integers;
    a transmission resource and information determining unit configured to select at least one of the M candidate channel resources, determined by the channel resource determining unit, and to select identification information to characterize the response information to be fed back; and
    a transmitting unit configured to transmit the identification information to characterize the response information to be fed back on the channel resource selected by the transmission resource and information determining unit.

12. The user equipment of claim 11, further comprising:
a receiving unit configured to receive the N semi-static channel resources configured by higher-layer signaling or to receive T semi-static channel resources configured by higher-layer signaling and a Physical Downlink Control Channel, PDCCH, to indicate the N semi-static channel resources among the T semi-static channel resources; and wherein the PDCCH received by the receiving unit to indicate the semi-static channel resources is transmitted on a Down Link Secondary Component Carrier, DL SCC, of the UE to schedule a Physical Downlink Shared Channel, PDSCH, on the DL SCC.

13. The user equipment of claim 11, wherein the channel resource determining unit is particularly configured to determine the L dynamic channel resources from the indexes of Control Channel Elements, CCEs, of PDCCHs transmitted on a Down Link Primary Component Carrier, DL PCC, of the UE.

14. The user equipment of claim 11, wherein the channel resource determining unit is further configured to determine S dynamic channel resources from the indexes of PDCCHs transmitted on a DL PCC of the UE and to select the L dynamic channel resources from the S dynamic channel resources, wherein S is a nonnegative integer, as the candidate channel resources particularly as follows:

with $S>(M-N_0)$, $L=(M-N_0)$ and $N=N_0$ are determined, and the channel resource determining unit selects $(M-N_0)$ dynamic channel resources from the S dynamic channel resources, wherein $N_0$ is the smallest number of semi-static channel resources, configured by higher-layer signaling or predefined between a base station and the UE, for transmission of he K-bit response information to be fed back, and $0 \le N_0 \le M$; and with $S \le (M-N_0)$, $L=S$ and $N=(M-S)$ are determined.

15. The user equipment claim 11, wherein the transmitting unit is particularly configured to transmit the identification information to characterize the response information to be fed back using the Physical Uplink Control Channel, PUCCH, format 1b on the channel resource selected by the transmission resource and information determining unit.

16. A base station, comprising:
a response information determining unit configured to determine the number of bits of response information to be fed back from a UE as K;
a channel resource determining unit configured to determine M channel resources to be detected including L dynamic channel resources and N semi-static channel resources, wherein $M=(L+N)$, $0 \le N \le M$, $(M-N) \le L \le M$, and M, L and N are integers; and
a receiving unit configured to receive identification information to characterize the response information on the channel resources to be detected and to obtain the response information.

17. The base station of claim 16, further comprising:
a transmitting unit configured to transmit the preset N semi-static channel resources to the UE or to transmit preset T semi-static channel resources to the UE and a Physical Downlink Control Channel, PDCCH, to the user equipment to indicate the N semi-static channel resources among the T semi-static channel resources; and wherein the PDCCH transmitted from the transmitting unit to indicate the semi-static channel resources is transmitted on a Down Link Secondary Component Carrier, DL SCC, of the UE to schedule a Physical Downlink Shared Channel, PDSCH, on the DL SCC.

18. The base station of claim 16, wherein the channel resource determining unit determines the L dynamic channel resources particularly from the indexes of Control Channel Elements, CCEs, of PDCCHs transmitted on a Down Link Primary Component Carrier, DL PCC, of the UE.

19. The base station of claim 16, wherein the channel resource determining unit is further configured to determine S dynamic channel resources from the indexes of CCEs of PDCCHs transmitted on a DL PCC and to select the L dynamic channel resources from the S dynamic channel resources, wherein S is a nonnegative integer, as the channel resources to be detected particularly as follows:

with $S>(M-N_0)$, $L=(M-N_0)$ and $N=N_0$ are determined, and the channel resource determining unit selects $(M-N_0)$ dynamic channel resources from the S dynamic channel resources, wherein $N_0$ is the smallest number of semi-static channel resources, configured by higher-layer signaling or predefined between the base station and the UE, for transmission of the K-bit response information, and $0 \le N_0 \le M$; and with $S \le (M-N_0)$, $L=S$ and $N=(M-S)$ are determined.

20. The base station of claim 16, wherein the transmitting unit is particularly configured to receive the identification information to characterize the response information to be fed back using the Physical Uplink Control Channel (PUCCH) format 1b on the channel resources to be detected.

* * * * *